United States Patent [19]

Yamamoto

[11] 3,789,270

[45] Jan. 29, 1974

[54] WIRING SYSTEM FOR GROUP TESTING APPARATUS

[75] Inventor: Hiroshi Yamamoto, Tokyo, Japan

[73] Assignee: Kabushiki Kaisha Synapse, President Hiroshi Yamamoto, Tokyo, Japan

[22] Filed: Nov. 9, 1971

[21] Appl. No.: 196,953

[30] Foreign Application Priority Data

Nov. 21, 1970 Japan ............................ 45/102949

[52] U.S. Cl. .................... 317/99, 35/48 R, 340/306, 307/115

[51] Int. Cl. .............................................. G09b 5/00

[58] Field of Search ... 307/11 S; 340/286, 305, 306; 200/51.11; 35/48 R; 174/11 R; 324/51

[56] References Cited

UNITED STATES PATENTS

| | | | |
|---|---|---|---|
| 3,199,230 | 8/1965 | Sylvester | 35/48 R |
| 418,322 | 12/1889 | Rounseville | 340/286 |
| 453,982 | 6/1891 | Milliken | 340/305 |
| 505,819 | 10/1893 | Downs | 340/286 |

FOREIGN PATENTS OR APPLICATIONS

| | | | |
|---|---|---|---|
| 301,021 | 2/1929 | Great Britain | 340/286 |

*Primary Examiner*—Herman J. Hohauser
*Assistant Examiner*—Gerald P. Tolin
*Attorney, Agent, or Firm*—E. F. Wenderoth et al.

[57] ABSTRACT

A method of forming wire lines and wiring members used therefor for a group tester comprising wire lines linking a master unit and subsidiary units thereof and wires for the subsidiary units both of which are constituted at the same time, the said master unit accumulating test results by connecting in series the wiring members having the said subsidiary units coupled therewith, as response units for examinees who receive tests.

5 Claims, 12 Drawing Figures

INVENTOR

HIROSHI YAMAMOTO

BY Wenderoth, Lind & Ponack

ATTORNEYS

HIROSHI YAMAMOTO,
INVENTOR

BY Wenderoth, Lind & Ponack
ATTORNEYS

INVENTOR

HIROSHI YAMAMOTO,

BY Wenderoth, Lind & Ponack

ATTORNEYS

HIROSHI YAMAMOTO,
INVENTOR

BY Wenderoth, Lind & Ponack
ATTORNEYS

WIRING SYSTEM FOR GROUP TESTING APPARATUS

MATTERS ON WHICH THE INVENTION IS BASED

A group tester has been used tentatively and occasionally with the recent development of the tester as an accumulating machine permitting a rapid confirmation of wills or degree of intelligence of examinees in a group and bringing about a great interest among schools, government offices, firms and other organizations. Nevertheless, the rapid expansion of such group tester has been prevented by the remarkably high cost resulting from the performance needs of the tester requiring the functions of an individual confirmation of examinees, a feedback of true or false answer, and an accumulating operation respectively of the number of true or false answers. The first need of the tester, however, is immediately to provide the degree of intelligence of examinees in a group, and, once satisfied, is generally accepted to have achieved most of its objective. From this standpoint, a group tester has been suggested so as immediately to supply the percentage of true or false answers provided by the examinees by measuring a circuit electric current, based on the principle that a value of the electric current flowing from a power supply with resistances of an equivalent value being connected in parallel varies in proportion to the number of the said resistances. However, the said tester has required relay boxes to be linked with wire lines, to which boxes are connected branch lines each of which has a subsidiary unit coupled therewith, thereby causing various inconveniences of requiring a considerable amount of labor and time for installing or removing the wire lines, relay boxes, and branch lines which are inclined to stand in the way of workers when permanently wired, and necessitating a fixed location of a testing room and a fixed arrangement of seats with an increased danger of stained or damaged wiring members, which all have considerably reduced the specific features of a simplified group tester aiming at a handiness and a low cost.

In using a group tester as a need arises, locations of the wire lines to be installed may be on the floor, below the floor or over the ceiling; being installed on the floor, the lines not only stand in the way in sweeping on the floor but also cause accidents when the lines or branch lines catch walkers by the leg; wiring below the floor is practically difficult; when permanently wired, it restricts a place or location of the tester to be used, requiring relay boxes and branch lines to be installed on the floor which become troublesome as described above. It may be an idea that branch lines are taken from the wire lines installed over the ceiling to be extended to a subsidiary unit, but the branch lines restrict a scope of sight, requiring much labor and additional permanent wiring elements to be used. In order to eliminate the aforesaid disadvantages, therefore, the present invention can ease walkers of obstacles, allowing an optional arrangement of seats as well as facilitating an operation of wiring or removing the same by connecting a subsidiary unit being equipped with a connector to one end of a cable and by connecting an optional number of wiring members equipped with connectors in series to the other end of the said cable, both the connections realizing a combined use of cable lines, relay boxes, and subsidiary units and their branch lines.

BRIEF SUMMARY OF THE INVENTION

The invention consists in connecting a subsidiary unit equipped with a switch to one end of a cable comprising plural single lines, with a connector being coupled with a terminal of the said subsidiary unit, and linking a connector with the other end of the said cable, which allows a connection of the two connectors. The subsidiary unit is equipped with a switch which is connected in parallel to a cable. Boxes containing the subsidiary unit and the connectors should preferably be made of insulation materials having flexibility and elasticity, such as rubber and plastics (Hizex) suffering no damage or deformation when stamped down or when receiving an impact with other objects, in order to prevent an electrode being exposed outside. The connecting strength of a connector should be decided in consideration of the strength of a cable so that the connector can easily be detached from the cable before the latter receives an excessive force.

Two answers can be obtained by one switch for a cable comprising two single lines and three answers are available by using two switches for a cable comprising three single lines. In the same manner, a variety of answers can be obtained by increasing the number of single lines incorporated into a cable and that of switches, thereby increasing the number of terminals of the connectors.

An object of the invention is to complete an arrangement of wires by connecting a subsidiary unit to one end of a cable and connecting in series wiring members having connectors coupled with the other end of the said cable. Another object is to make up a subsidiary unit by connecting switches to single lines of a cable. A further object is to use a cable equipped with a subsidiary unit as a cable linking a master unit with the said subsidiary unit. A still further object is to form wiring lines by connecting the wiring members of relatively short length. A more specific object is to connect each of the subsidiary units in series, requiring no branch lines therefor as a result.

BRIEF DESCRIPTION OF THE SEVERAL VIEWS OF DRAWINGS

FIG. 1 is a circuit diagram showing a group tester comprising the wiring members of the invention. FIG. 2 is a layout drawing showing the subsidiary units arranged in four lines. Figure 3 is a layout drawing showing the said units arranged in a circle. FIG. 4 is a plan of a sectional portion of a connector having a terminal with projecting prongs and a terminal with pinching pieces, as it is connected in one embodiment of the invention. FIG. 5 is a plan of a connector having a hooked projection as it is connected in another embodiment of the invention. FIG. 6 is an enlarged perspective view of a section X — X shown in FIG. 5. FIG. 7 is an enlarged sectional view of a joint of a connector. FIG. 8 is a plan of a connector having a projecting terminal as it is used in one embodiment of the invention. FIG. 9 is an enlarged plan of a sectional portion of a joint of the same as shown in FIG. 8. FIG. 10 is a bottom view of FIG. 9. FIG. 11 is one embodiment showing a cable comprising three single lines. FIG. 12 shows a conventional group tester being wired.

DETAILED DESCRIPTION OF THE INVENTION

The invention relates to a method of forming wiring lines and wiring members used therefor for a group tester being characterized in coupling a subsidiary unit equipped with a switch with one end of a cable comprising plural single lines while making up wiring members by linking a connector with the other end of the said cable, in order to complete the wiring members for the said tester by connecting the wiring members in series.

According to the invention, a cable may comprise more than two single lines depending on a mode of use, intended to interconnect the connectors and never to limit the structure thereof.

Figure 1:
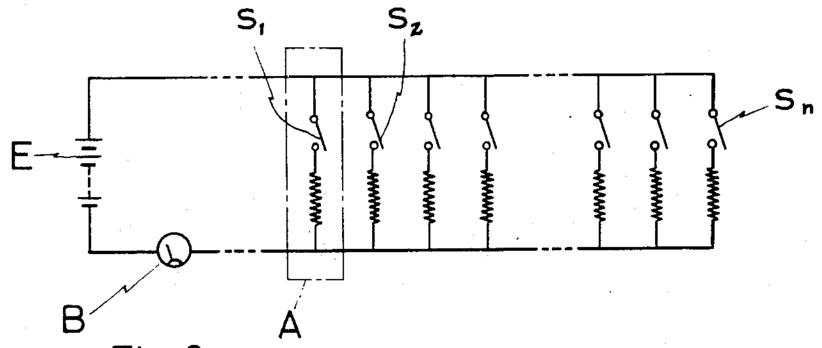
Figure 2:
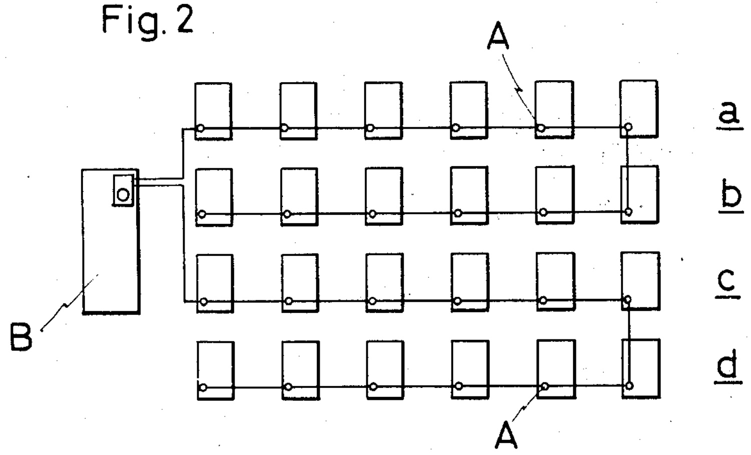
Figure 3:
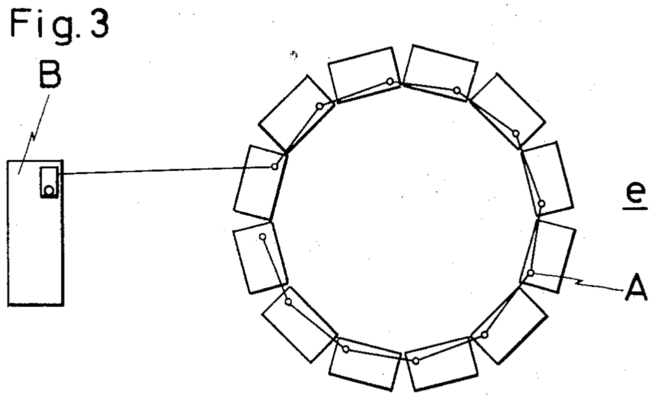
Figure 4:
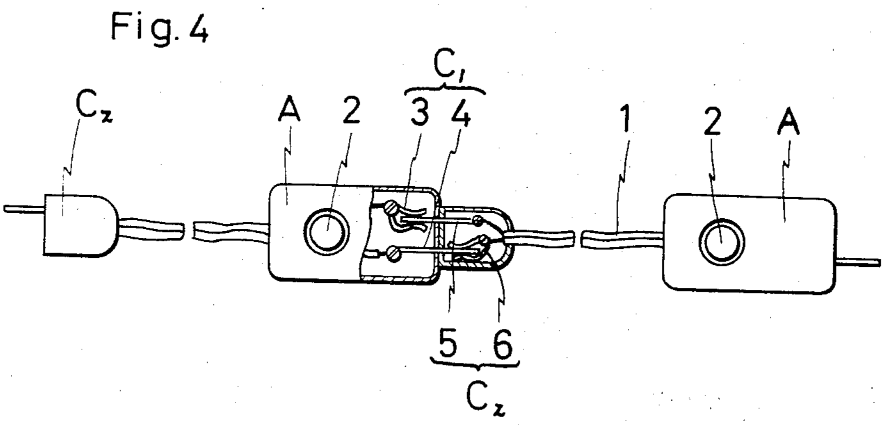
Figure 5:
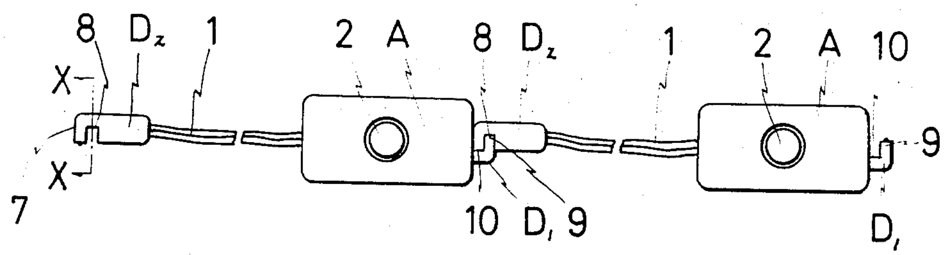
Figures 6, 7:
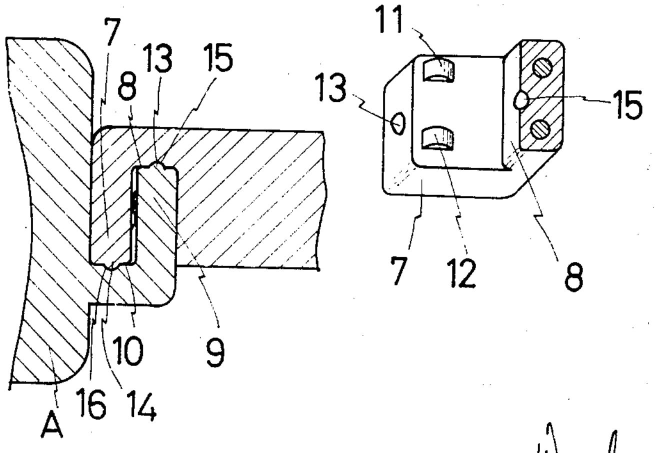
Figure 8:
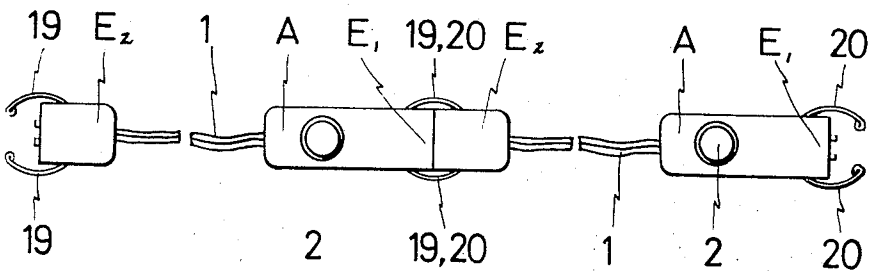
Figure 9:
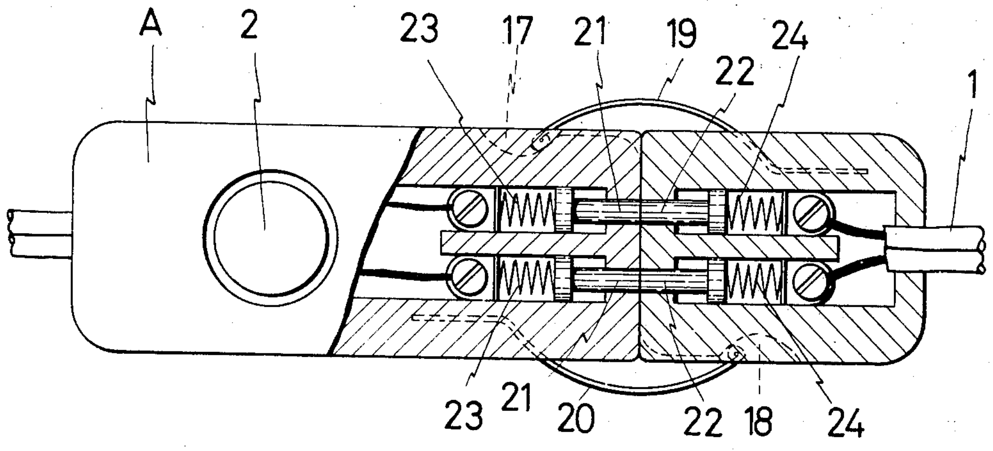
Figure 10:
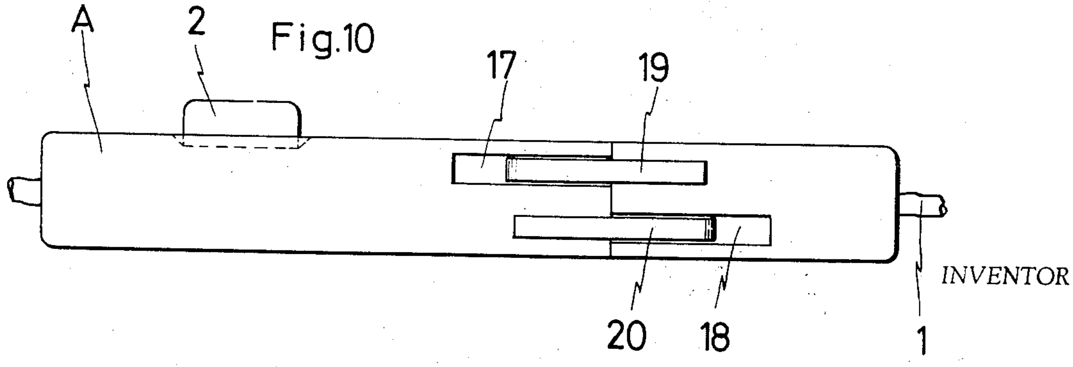
Figure 11:
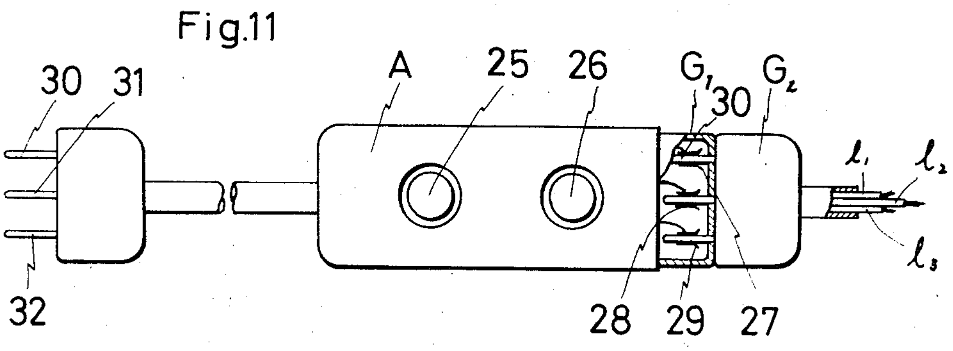

THE INVENTION WILL BE EXPLAINED BY WAY OF EMBODIMENTS THEREOF, AS FOLLOWS:

Wiring members are formed in such a manner as one end of a cable 1 comprising two single lines is connected to a subsidiary unit A having a switch 2 coupled in parallel with the said two lines, the said unit A having a connector C1 comprising a pinching terminal 3 and an inserting terminal 4 and the other end of the cable 1 is connected to a connector C2 comprising an inserting terminal 5 and a pinching terminal 3, 6 of the connectors C1, C2 to be interconnected. In order to realize wiring lines for a group tester by means of the said wiring members, the said subsidiary unit A is fixed on a desk with a connector C2 of a cable 1 coupled with the unit A being linked with a connector C1 of an adjacent unit A in order to obtain desired wiring lines ends of which are connected to a master unit B. Complete wiring lines can be obtained by means of a number of the said wiring members being interconnected in series, whether desks may be arranged in lines *a, b, c, d* as shown in FIG. 2 or in a circle *e* as shown in FIG. 3. The said unit A can be temporarily fixed on a desk by means of an adhesive rubber. In these figures, E is a power supply and S1, S2. . . .Sn are switches for each of the subsidiary units. The above embodiments show the connectors C1 and C2 are interconnected, and the construction being such that the connectors C1 and C1 or the connectors C2 and C2 are interconnected, it will be more convenient, also being used as a relay cable when no subsidiary unit is connected. The figures 5 to 7 show other embodiments of the invented wiring materials wherein hooked projections 7, 9 and fitting grooves 8, 10 are equipped for the connectors D1, D2, terminals 11, 12 being exposed inside the said projections 7, 9 with projections 13, 14 being equipped for the outer end of the said projections 7, 9 and hollows 15, 16 being so equipped as to fit the said projections 13, 14 into the base of the said fitting grooves 8, 10. The connectors D1, D2 have no danger of being detached even if the joints are forced from every corner, as the projections 7, 9 are fitted into the fitting grooves 8, 10 respectively so that the terminals 11, 12 are brought into contact with the projections 13, 14 being fitted into the hollows 15, 16. The figures 8 to 10 show further embodiments of the invention wherein the connectors E1, E2 are equipped with pieces 19, 20 that can be hooked into the hollows 17, 18 made on the opposite wall thereof, so that terminals 21, 21 : 22, 22 hold their positions as projections with springs 23, 24 putting the terminals in contact, thereby enabling the connectors E1, E2 to be interconnected with the said pieces 19, 20 being hooked into the said hollows 17, 18. The figure 11 shows a wiring member of a cable comprising three single lines L1, L2, and L3, wherein a subsidiary unit A is equipped with two switches 25, 26, for which a connector G1 is equipped with three pinching pieces 27, 28, and 29 with a connector G2 having three inserting pieces 30, 31, and 32 and the said switches 25, 26 are connected in parallel to each of the said singule lines. The embodiments shown in the above FIGS. 4 to 10 enable the connectors to be linked with one of the same type as well as one of different types, but are not restrictive as such connectors as conventional plugs and receptacles shown in the FIG. 11 may well be used in order to realize a connection by connectors of different types.

Figure 12:
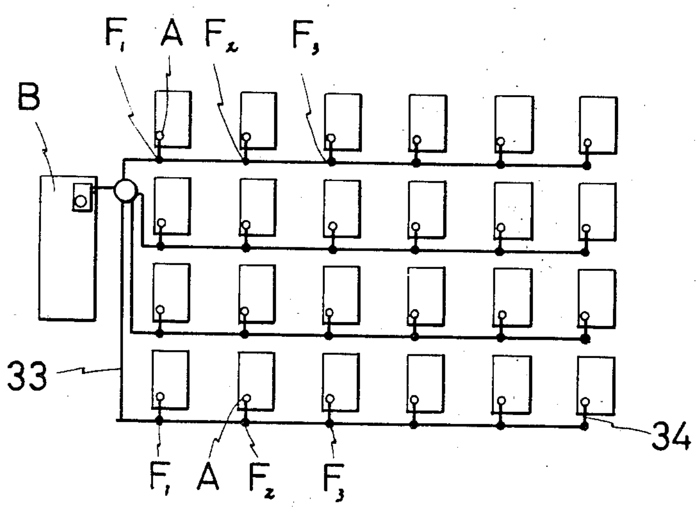

The FIG. 12 shows a wiring diagram of a conventional group tester wherein the wiring lines are completed with a master unit B being linked with one end of the basal line 33 of a cable, along which relay boxes F1, F2, F3 and so on are interposed into place, the relay boxes being coupled with a subsidiary unit A by means of a branch line 34. Briefly stated, the present invention realizes a complete wiring lines for a group tester wherein a subsidiary unit A having the connectors C1, D1 E1 and so on are connected to one end of a cable comprising plural single lines, and the connectors C2, D2, E2 and so on are coupled with the other end of the said cable, the said unit A having switches connected in parallel to the said cable which is connected in series.

Therefore, the invention has various advantages of simplifying the wiring work, making the wiring work or removal thereof much easier and working out wire lines regardless of any arrangement of seats.

If a length of a wiring member is properly determined, it can realize much easier handling and care of the member as well as complete the wiring work with greater ease. The invention has further advantages of minimizing occasions of staining or damaging the wiring members and eliminating obstacles for walkers and for a scope of sight, as adjacent desks are linked by only one wiring member.

I claim:

1. A wiring system for a group testing apparatus comprising at least one group of individual testing stations, each testing station having a connecting means with at least two parallel conductors therein, a test response switch connected across each pair of parallel conductors and a connector at one end of each conductor, a cable having a plurality of strands corresponding to the number of conductors in the connecting means and having one end connected to the respective conductors in the connecting means, and a cable connector on the other end of the cable having a plurality of connector elements corresponding to the number of strands in the cable and electrically and detachable connected to the respective connectors in a connecting means, said group consisting of a plurality of said connecting means, connectors and cables being connected in series, and a master station to which the last cable in the series is connected and having indicator means therein for indicating the number of test response switches which are closed in the individual test stations.

2. A wiring system as claimed in claim 1 in which there are a plurality of groups of testing stations each group consisting of connecting means, connectors and cables connected in series and the last cable in each group being connected to the master station.

3. A wiring system as claimed in claim 1 in which the testing stations are arranged in a circle.

4. A wiring system as claimed in claim 1 in which there is a single pair of conductors in each connecting means and each cable, and there is a single test response switch connected across said pair of conductors.

5. A wiring system as claimed in claim 1 in which there are three conductors in each connecting means and each cable, and there are two test response switches, one connected across the first and second conductors and the other connected across the second and third conductors.

* * * * *